C. A. DOUGLAS.

MILK-COOLER.

No. 6,744. Reissued Nov. 16, 1875.

Witnesses:
Henry Binley.
Chas. J. Sawyer.

Charles A. Douglas
by his Attorney Alex. Selkirk
Inventor.

N. PETERS, PHOTO-LITHOGRAPHER, WASHINGTON, D. C.

UNITED STATES PATENT OFFICE.

CHARLES A. DOUGLAS, OF FRANKLIN, NEW YORK.

IMPROVEMENT IN MILK-COOLERS.

Specification forming part of Letters Patent No. 123,813, dated February 20, 1872; reissue No. 6,744, dated November 16, 1875; application filed October 1, 1875.

*To all whom it may concern:*

Be it known that I, CHARLES A. DOUGLAS, of Franklin, county of Delaware and State of New York, have invented certain Improvements in Milk-Coolers; and I do hereby declare that the following is a description thereof, reference being had to the accompanying drawings, in which—

Figure 1:
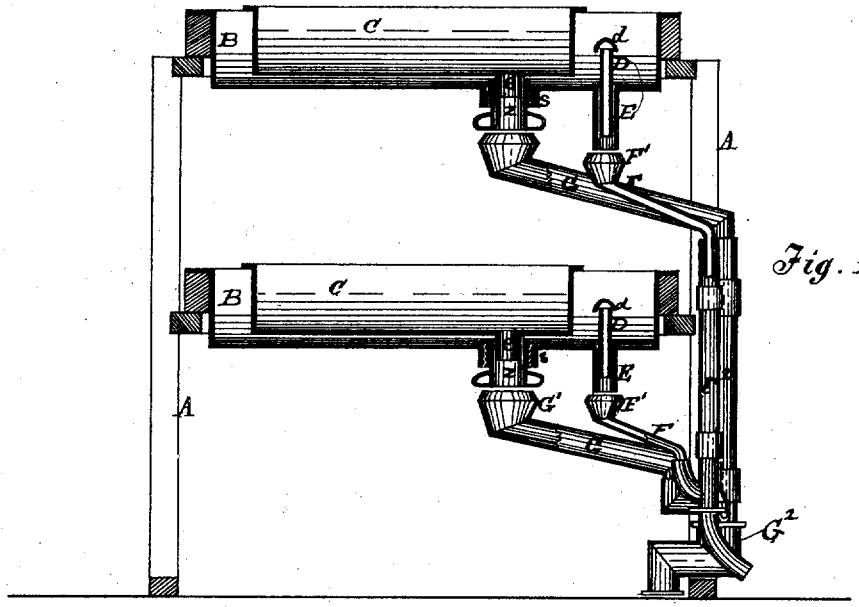
Figure 2:
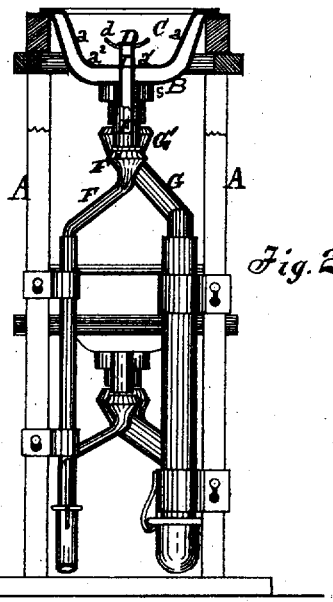
Figure 3:
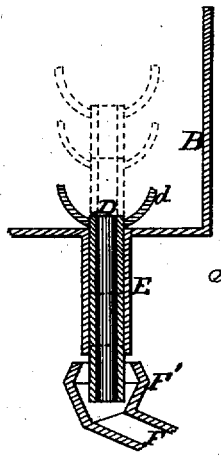

Figure 1 is a sectional elevation of the apparatus embodying the improvements in this invention. Fig. 2 is a transverse section of the same. Fig. 3 is an enlarged view of the governor.

My invention relates to an apparatus for holding milk at a given temperature by means of running water; and consists in the several devices and their combinations, hereinafter described, the object being to first reduce the temperature of the milk to about sixty-two (62°) degrees, and hold it at the same, so that the cream contained in the milk will be capable of rising to the surface of the milk in a uniform and rapid manner without any check, until all or the major portion is freed from the bulk of the milk in the vessel; also, to economize space for operating with large quantities, and also for a cleanly and economical operation, both with the milk and water operated with.

To enable others skilled in the art to make and use my invention I will proceed to describe it in reference to the drawings and the letters of reference marked thereon, the same letters indicating like parts.

In the drawings, A represents any suitable frame-work capable of supporting the several parts of the apparatus. B is the water-vessel, constructed of wood or metal, or other suitable material. C is a vessel setting within the water-vessel, with its bottom at about three-quarters ($\frac{3}{4}$) of an inch from the top surface of said water-vessel, more or less, and is intended to contain the milk to be operated with. The said milk-vessel is made with flaring sides *a*, flat bottom $a^1$, and with intermediate concave corners $a^2$, as shown in Fig. 2.

By this form of construction of said milk-vessel the milk is prevented from being too rapidly affected in its temperature by the water in the lower vessel, by reason of the less area of lower immersed surface of said milk-vessel in the water than would be had were the sides perpendicular and with angular corners, as heretofore constructed, while at the same time the flaring sides and concave corners permit a free and easy removal of all the old milk, and prevent that accumulation of any souring refuse as is had in the angles or corners of the milk-vessels as heretofore constructed.

The vessels B and C have each an independent discharge-tube for carrying off their contents, as may be required, without the liquid of the one vessel interfering with the other in its flow. To effect this I employ a short tube, *e*, secured to the bottom of the milk-vessel, and a tube, *s*, secured to the bottom of the water-vessel, and the conduct-tube *z*, working up through the tube *s*, and connecting with the tube *e*, as shown in Fig. 1.

When the tube *e* is plugged or stopped from its upper end no milk can escape from the milk-vessel; but when the stopper is removed the milk will run out through the said tube, and escape down through the tube *z* to a discharge into any vessel or conduct; but when the tube *e* is stopped, and the tube *z* is disconnected from the tube *e*, the water in the vessel B may be drawn off, and discharged into the same vessel or conduct, and in both cases at the same point.

This part of my apparatus forms no part of this invention, it belonging to a former invention, for which a patent has been granted to me.

With the water-vessel B I employ a device which I call the "water-governor," located at any desirable point in the said vessel. The said device consists of a tube, D, open at both ends, and provided with any suitable ears or radial handles *d*, for convenience in the operation of setting. The said tube nicely fits within a second tube, E, secured to the bottom of said water-vessel, and is free to be moved vertically in either direction, to either lengthen or shorten the distance of the upper end of the tube D above the upper surface of the bottom of said water-vessel, as shown in Fig. 3 by full and dotted lines.

The said governor operates to maintain or hold the milk in the vessel C to one given temperature by holding the water in the vessel B to a sufficient height for a proper immersion of the surfaces of the walls of the milk-vessel, so that the body of the water at any temperature between freezing and 60° in the lower vessel may be regulated and steadily maintained to a depth proportionate to the body of milk to be operated with in the immersed vessel, and the temperature of the room in which the apparatus is placed, as may be necessary to secure the proper temperature of the milk in a uniform manner for the time required for the rising of the cream to the surface.

F is a conduct-pipe, provided with a funnel-mouth, $F^1$, above, and leading to any suitable discharge end, for conveying away the water from the vessel B as it is permitted to run off through the governor D to any gutter or other channel for conveyance from the milk-room. G is a conduct-pipe, provided with a funnel-mouth, $G^1$, for conducting both the milk and water, as they may be drawn from the vessels B and C, separately, as desired, into any vessel, or vessels, or conductor that may be employed to receive the liquids so drawn.

Two or more sets of the said vessels, with their adjuncts, as above described, are supported in the same frame A, one above the other, as shown in Figs. 1 and 2. By this employment of two or more vessels space in the milk-room is not only economized, but the operations with the apparatus and liquids may be made more convenient to the person in charge.

In operating with this improved apparatus the milk is poured into the vessel C to any desired depth, with the tube *e* plugged to prevent its escape. A small stream of water is permitted to flow continuously into the vessel B, and the governor D is adjusted vertically to a height sufficient to cause the water in the vessel B to rise up to near the upper margin edge of the vessel C, to which height the water is to be held until the temperature of the milk is lowered to about sixty-two (62°) degrees, which is done in a few minutes. If the running water is of low temperature, say about forty-five (45°) degrees, the governor is lowered until the body of the water is reduced in depth sufficient for maintaining the said sixty-two (62°) degrees of temperature with the milk in all the time the same body of milk may be in operation; but if the temperature of the running water is higher, say about 55°, the governor is to be raised until the height of the water surrounding the milk-vessel will be sufficient to maintain the body of the milk to the desired temperature, and in all cases the said governor may be set to lessen or increase the depth of the immersion of the milk-vessel; that the running water, at any temperature below sixty (60°) degrees, may be held steadily to retain the temperature of the milk to one desired temperature, with the depth of water at one temperature, and in a given body proportionate to the body of the milk to be operated with, and to be held at a certain uniform temperature higher than that of the running water.

A little experience and care will enable an operator to readily adjust the governor to a height above the bottom of the water-vessel sufficient to cause the temperature of the water to control the temperature of the milk operated with.

In this invention I employ two or more water-vessels, B B, one placed above the other in the frame A, and each containing a milk-vessel, C, as above described, in which each set of vessels are provided with the adjuncts above described, for drawing off both the water and milk, and regulating the temperature of the milk-vessel. Each set of said vessels have conducts F and G of their own. The conducts F F terminate in a common conduct, $F^2$, at some point below the lowermost conduct, by which the water from vessels B B may be unitedly conveyed away from the milk-room through one gutter or channel to some receptacle or place without. The conducts G G also terminate in a common conduct, $G^2$, below the lowermost one, so that either the milk or water may be simultaneously discharged from their similar vessels into one receptacle or gutter, either in or without the milk-house.

The improvements in this apparatus dispense with the use of ice, and the care and labor heretofore attending milk-coolers to preserve a proper temperature of the milk and removal of the liquids operated with.

Having described my invention, what I claim, and desire to secure by Letters Patent, is—

1. The vessels B and C, placed one within the other, with a space between for water, tubes *e*, *s*, and *z*, and the conduct G, combined to operate substantially in the manner set forth.

2. The water-vessel B, milk-vessel C, with space between for running water, governor D, tube E, and conduct F, combined to operate substantially in the manner set forth.

3. A series of water-vessels, B, placed one above the other, each with a milk-vessel, C, supported within, with a water-circulating space between their walls, governors D D, conducts F F, terminating with a common conduct, $F^2$, and conducts G G, terminating in a common conduct, $G^2$, all combined to operate as set forth.

CHARLES A. DOUGLAS.

Witnesses:

CHARLES NOBLE,

AMOS DOUGLAS.